United States Patent Office

3,700,573
Patented Oct. 24, 1972

3,700,573
METHOD OF PREPARATION OF HYDROPHILIC SILICONES BY RADIOCHEMICAL GRAFTING
Jacques Laizier, 23 Rue de la Marseillaise, Vincennes, France, and Georges Wajs, 23 Rue de Bordeaux, Charenton, France
No Drawing. Continuation of application Ser. No. 684,607, Nov. 21, 1967. This application Nov. 20, 1969, Ser. No. 871,704
Claims priority, application France, Dec. 1, 1966, 85,735
Int. Cl. C08f 1/16, 35/02
U.S. Cl. 204—159.13
5 Claims

ABSTRACT OF THE DISCLOSURE

In a method of preparation of hydrophilic silicones by radiochemical grafting, a compound of the silicone family is first exposed to ionizing radiation in an oxidizing medium. The irradiated body is then put in the presence of a monomer at a temperature within the range of 120 to 160° C. and thus endowed with an absorptive capacity for water.

---

This application is a streamline continuation application of parent U.S. application Ser. No. 684,607, filed Nov. 21, 1967, and now abandoned.

This invention relates to a method of preparation of hydrophilic silicones by radiochemical grafting. This method is of particular interest for the preparation of silicone contact lenses.

Silicones find a wide variety of applications, especially as prosthesis material, by virtue of their properties of physiological inertness, high permeability to gases such as oxygen and carbon dioxide, and thermal stability.

However, silicones also have one essential property in that they are hydrophobic, or water-repellent. In some cases, water-repellency is highly advantageous and this very property is turned to useful account in the majority of applications for which silicones are at present employed.

On the other hand, in other fields such as the field of prostheses, water-repellency is a disadvantage which limits the applications of these products. Thus, silicone rubber has been employed for the fabrication of contact lenses. One of the main causes of inconvenience to wearers of contact lenses is the formation of dry spots on the eyeballs. These dry spots are due to local lachrymal deficiency on the eyeball surface and produce a subjective feeling of burning and irritation caused by the hydrophobic nature of the constituent material of the lens.

Researches have therefore been undertaken in order to endeavor to overcome this difficulty by endowing silicones with hydrophilic or water-absorbent properties.

Different methods have been employed which, in some cases, are related to classical chemistry and which, in other cases, have recourse to radiochemical grafting.

Thus, in the case of contact lenses formed of silicone, it has proved feasible to render the lens hydrophilic by metallizing the lens surface in vacuo. Another technique consists in dipping the lens in surface-active agents or in carrying out a sulphonation process. The lens can also be immersed in an organic solution of alkyl titanate, then dried and subjected to hydrolysis.

Copolymers have been produced by means of an organo-silicic polymer having the general formula

which has previously been irradiated without oxygen and which is contacted with a vinyl compound. Irradiation must be performed at very low temperatures of the order of −100° C. and either in a vacuum or in an inert atmosphere.

Some attempt has also been made to endow silicones with stable and lasting hydrophilic properties by grafting vinylpyrrolidone on the polydimethylsiloxanes by irradiating them mutually with high-energy electrons produced by a Van de Graaff generator.

It has been found that the different methods mentioned above are not wholly satisfactory for a number of different reasons. In the first place, they do not retain all the properties of the silicones. In the case of an ocular prosthesis, some methods of grafting by irradiation result in reduction of the optical properties which the manufactured products must possess. In the method described above in connection with the sulphonation process, ionized groups are produced which explain the absence of physiological innocuity which is essential to some prostheses and in particular ocular prostheses. Finally, some known methods do in fact endow silicones with an absorptive capacity for water, but this property is not permanent and rapidly disappears after washing or drying. As to the last method referred-to which consists in mutually irradiating silicones and vinylpyrrolidone, it is scarcely possible by means of this method to retain the optical properties of the silicones. In the case of high grafting rates, deformation of the irradiated sample is observed.

The present invention is directed to a method of preparation of hydrophilic silicones by radiochemical grafting which makes it possible to endow silicones with lasting hydrophilic properties without entailing the disadvantages mentioned above.

The method under consideration is characterized in that a compound of the silicone family is first exposed to ionizing radiation in an oxidizing medium and that the irradiated body is then put in the presence of a monomer which provides adsorptive capacity for water.

The oxidizing medium can be pure oxygen, air or an oxidizing solution.

According to different modes of execution of the invention, the silicone body can be provided in a form having a variable geometry and may consist in particular of a plate, disc or film.

The silicone employed can advantageously be a resin or elastomer whether charged or not and having a base, for example, of polydimethylsiloxane. The irradiation phase can be carried into effect by subjecting the product to ionizing radiations such as γ-rays, X-rays or high-energy electrons produced by a particle accelerator.

In order that effective radiochemical grafting may subsequently be performed, the irradiation dose is preferably within the range of 0.1 to 20 mrads.

In the second stage of the method in accordance with the invention, the irradiated product which contains peroxide groups is advantageously put in the presence of N-vinylpyrrolidone either in the pure state or in solution in order to endow the starting product with a hydrophilic capacity which, contrarily to the methods of the prior art, is both stable and durable in time. Use can also be made of an allyl alcohol, hydroxyethylmethacrylate or hydroxypropylmethacrylate. However, this enumeration of monomers is obviously not intended to be limitative. Preferably, the preparation is continued by removing the dissolved oxygen by degassing in a vacuum which is, for example, higher than $10^{-4}$ torr. The product is then brought to a temperature comprised within a range which has the ambient temperature as its lower limit whilst its upper limit is established only by the temperature of decomposition of silicones, namely of the order of 250° C. in the case of the silicones which are at present known. Preferably, the temperature is comprised within the range of 120 to 170° C. Under these conditions, the grafting reaction is initiated.

A final treatment which consists in washing the sample with distilled water followed by oven-drying results in the production of hydrophilic silicone according to the invention.

Broadly speaking, the nature and extent of the graft are dependent on a number of factors such as, in particular, the irradiation dose, the grafting time, the grafting temperature and the geometrical dimensions of the sample, as will be brought out by the examples which now follow. It will be understood that these examples are given solely by way of illustration and not in any sense by way of limitation.

EXAMPLE 1

As plate of Si 182 as manufactured by the firm known as S.I.S.S. which is a siloxanic chain having a vinylic group at the end on which a reticulation agent is reacted as described in U.S. Pat. No. 3,284,406 and having a length of 5 cms., a width of 1 cm. and a thickness of 1.5 mm. was subjected in the presence of air to a radiation dose of 10 mrads at an intensity of 1 mrad/h. After putting in the presence of N-vinylpyrrolidone, and after vacuum degassing and introduction in a vacuum-sealed glass ampoule, the plate was heated to a temperature of 80° C. for a period of 4 hours. The grafted plate was washed with distilled water, then brought to the boil for a further period of 30 minutes and finally oven-dried at a temperature of 100° C. The weight of grafted polyvinylpyrrolidone was then 24.8 mg. (2.7%) and the water absorption was 17.2 mg. (1.9%) after immersion in distilled water for a period of 24 hours.

EXAMPLE 2

A plate of RTV 10341 manufactured by the Societe Rhone-Poulenc which is a siloxanic chain having a vinylic group at the end as described by R. N. Meals in "Silicones," Annals of New York Academy of Science, and having a weight of 0.7363 g. was subjected in the presence of air to a radiation dose of 12 mrads at an intensity of 0.75 mrad/h. After putting in the presence of N-vinylpyrrolidone and after vacuum degassing and introduction in a vacuum-sealed glass ampoule, the plate was heated to a temperature of 80° C. for a period of 4 hours. The grafted plate was washed with distilled water, then brought to the boil for a further period of 30 minutes and finally oven-dried at a temperature of 100° C. The weight of grafted polyvinylpyrrolidone was then 23 mg. (3.1%) and a water absorption of 32.3 mg. (4.4%) was noted after immersion in distilled water for a period of 24 hours.

EXAMPLE 3

A plate of RTV 10341 having a weight of 0.4984 g. and a length of 5 cms., a width of 1 cm. and a thickness of 0.5 mm. was subjected in the presence of air to a radiation dose of 0.75 mrad at an intensity of 0.75 mrad/h. The irradiated plate was put in the presence of N-vinylpyrrolidone, degassed in vacuo and introduced in a vacuum-sealed glass ampoule, then heated to a temperature of 130° C. for a period of one hour. The grafted plate was washed with distilled water, then brought to the boil for a period of 30 minutes and finally oven-dried at a temperature of 100° C. The weight of grafted polyvinylpyrrolidone was then 27.9 mg. (5.6%) and the water absorption was 27.4 mg. (5.5%) after immersion in distilled water for a period of 24 hours.

EXAMPLE 4

A plate of RTV 10341 having a weight of 0.4511 g. was subjected to the same conditions as in Example 3 but with a radiation dose of 2.25 mrads. The weight of grafted polyvinylpyrrolidone was 40.1 mg. (8.9%) and the weight of absorbed water was 48.3 mg. (9.8%).

EXAMPLE 5

A plate of RTV 10341 having a weight of 0.5303 g. was subjected to the same conditions as in Example 3 but with a radiation dose of 4.5 mrads. The weight of grafted polyvinylpyrrolidone was 120.3 mg. (22.5%) and the weight of absorbed water was 182.5 mg. (28.1%).

EXAMPLE 6

A plate of RTV 10341 having a weight of 0.4771 g. was subjected in the presence of air to a radiation dose of 0.75 mrad at an intensity of 0.75 mrad/h. The irradiated plate was put in the presence of N-vinylpyrrolidone, degassed in vacuo and introduced in a vacuum-sealed glass ampoule for a period of 30 minutes at 130° C. The weight of grafted polyvinylpyrrolidone was 12.4 mg. (2.6%) and the weight of absorbed water was 11.6 mg. (2.4%).

EXAMPLE 7

A plate of RTV 10341 having a weight of 0.3297 g. was subjected to the same conditions as in Example 6 but at a temperature of 150° C. The weight of grafted polyvinylpyrrolidone was 35 mg. (10.6%) and the weight of absorbed water was 44.2 mg. (12.1%).

EXAMPLE 8

A plate of RTV 10341 having a weight of 0.4832 g. was subjected in the presence of air to a radiation dose of 1.5 mrad at an intensity of 0.75 mrad/h. The irradiated plate was put in the presence of N-vinylpyrrolidone, degassed in vacuo and introduced in a vacuum-sealed glass ampoule for a period of 30 minutes at 130° C. The weight of grafted polyvinylpyrrolidone was 17.4 mg. (3.6%) and the weight of absorbed water was 16.8 mg. (3.3%).

EXAMPLE 9

A plate of RTV 10341 having a weight of 0.3335 g. was subjected to the same conditions as in Example 8 but at a temperature of 150° C. The weight of grafted polyvinylpyrrolidone was 46.9 mg. (14.1%) and the weight of absorbed water was 62.1 mg. (16.3%).

EXAMPLE 10

A plate of RTV 10341 having a weight of 0.4436 g. was subjected in the presence of air to a radiation dose of 3 mrads at an intensity of 0.75 mrad/h. The irradiated plate was put in the presence of N-vinylpyrrolidone, degassed in vacuo and introduced in a vacuum-sealed glass ampoule for a period of 30 minutes at 130° C. The weight of grafted polyvinylpyrrolidone was 31 mg. (7%) and the weight of absorbed water was 31.4 mg. (7%).

EXAMPLE 11

A plate of RTV 10341 having a weight of 0.3332 g. was subjected to the same conditions as in Example 10 but at a temperature of 150° C. The weight of grafted polyvinylpyrrolidone was 67.4 mg. (20.2%) and the weight of absorbed water was 93.2 mg. (23.3%).

Examples 6 to 11 show that an increase in temperature results in distinctly higher grafting rates even under conditions of pre-irradiation and grafting time in which a temperature of 80° C. would have resulted in very low rates.

EXAMPLE 12

A plate of RTV 10341 having a weight of 0.4295 g. was subjected in the presence of air to a radiation dose of 2.25 mrads at an intensity of 0.75 mrad/h. The irradiated plate was put in the presence of N-vinylpyrrolidone, degassed in vacuo, introduced in a vacuum-sealed glass ampoule and heated to a temperature of 130° C. for a period of 30 minutes. The weight of grafted polyvinylpyrrolidone was 20.7 mg. (4.8%) and the weight of absorbed water was 22.1 mg. (4.9%).

EXAMPLE 13

A plate of RTV 10341 having a weight of 0.4511 g. was subjected to the same conditions as in Example 12 but with a heating time of one hour. The weight of grafted polyvinylpyrrolidone was 40.1 mg. (8.9%) and the weight of absorbed water was 44.2 mg. (9.8%).

EXAMPLE 14

A plate of RTV 10341 having a weight of 0.4015 g. was subjected to the same conditions as in Example 12 but with a heating time of 2 hours. The weight of grafted polyvinylpyrrolidone was 78.2 mg. (19.5%) and the weight of absorbed water was 103.2 mg. (21.5%).

EXAMPLE 15

A plate of RTV 10341 having a weight of 0.3966 g. was subjected to the same conditions as in Example 12 but with a heating time of 4 hours. The weight of grafted polyvinylpyrrolidone was 112.6 mg. (28.4%) and the weight of absorbed water was 171.7 mg. (33.8%).

EXAMPLE 16

A plate of RTV 10341 having a weight of 0.4569 g. was subjected to the same conditions as in Example 12 but with a heating time of 8 hours. The weight of grafted polyvinylpyrrolidone was 124.7 mg. (27.9%) and the weight of absorbed water was 154.7 mg. (26.5%).

In the case of a given pre-irradiation dose, there is an increase in the grafting rate to the point of consumption of the peroxide "sites," after which an increase in the grafting time no longer increases the rate and a level stage is accordingly reached (Examples 15 and 16).

The examples which have just been given show that the desired grafting rate can readily be obtained by modifying the parameters, radiation levels, grafting temperatures and duration.

For example, a grafting rate of the order of 12–13% can be obtained:

with a dose of 0.75 mrad by grafting for two hours at 130° C.;
or alternatively with the same dose of 0.75 mrad by grafting for 35 minutes at 150° C.;
or alternatively by grafting for a period of 30 minutes at 130° C. a sample which has received a dose of 4.5 mrads or for a period of 15 minutes at 130° C. in the case of a dose of 12 mrads.

It is apparent from the above that it accordingly becomes possible to suit the grafting conditions to the technological conditions laid down by the user, for example by modifying the gradient of the graft layer and therefore the rate of absorption of moisture and, in consequence, the surface properties of the grafted silicones.

The grafting method explained in the foregoing presents considerable advantages since it makes it possible to obtain a hydrophilic silicone which has retained all the properties of silicones. Moreover, the stable grafting obtained is superficial, thereby introducing practically no modification in the geometrical characteristics of the substratum.

Furthermore, one undeniable advantage insofar as the industrial application of the invention is concerned lies in the fact that there is a dissociation between the irradiation stage and the grafting stage, thereby permitting the possibility of irradiating in a single operation a large quantity of finished or semi-finished products and of carrying out the grafting process later and as requirements dictate. Storage is easy and in no way affects the possibilities of subsequent grafting.

The method according to the invention has already been mentioned in the case of its application to silicone contact lenses but can also be employed in many other fields, notably in prostheses, in the fabrication of membranes for blood oxygenation, membranes for artificial kidneys or artificial hearts, in the fabrication of surfaces to be printed, in dyeing and bonding and so forth, these indications being by no means limitative.

We claim:
1. A method of preparation of hydrophilic silicones by radiochemical grafting, the steps of exposing a polyorganosiloxane selected from the group consisting of polyorganosiloxanes consisting essentially of dimethylsiloxane and methylphenyl siloxane to ionizing radiation in an oxidizing medium comprising oxygen and then placing the irradiated body in the absence of oxygen in the presence of a monomer selected from the group consisting of N-vinylpyrrolidone, allyl alcohol, hydroxyethylmethacrylate and hydroxypropylmethacrylate at a temperature in the range of 80 to 170° C. which renders the body hydrophilous.

2. A method in accordance with claim 1, the oxidizing medium being oxygen, air or an oxidizing solution.

3. A method in accordance with claim 1, the polyorganosiloxane being an elastomer.

4. A method in accordance with claim 1, the grafted monomer being N-vinylpyrrolidone.

5. A method in accordance with claim 1 the oxygen dissolved in the polymer being removed in vacuo.

References Cited

UNITED STATES PATENTS

| 2,956,899 | 10/1960 | Cline | 117—47 |
| 2,959,569 | 11/1960 | Warrick | 260—827 |

FOREIGN PATENTS

| 860,327 | 2/1961 | Great Britain | 204—159.13 |

MURRAY TILLMAN, Primary Examiner
W. J. BRIGGS, Sr., Assistant Examiner

U.S. Cl. X.R.

204—159.15; 260—827, 877

PO-1050
(5/69)

UNITED STATES PATENT OFFICE
CERTIFICATE OF CORRECTION

Patent No. 3,700,573  Dated October 24, 1972

Inventor(s) Jacques Laizier and Georges Wajs

It is certified that error appears in the above-identified patent and that said Letters Patent are hereby corrected as shown below:

[73] Assignee: Commissariat A L'Energie Atomique, Paris, France.

Signed and sealed this 17th day of April 1973.

(SEAL)
Attest:

EDWARD M. FLETCHER, JR.
Attesting Officer

ROBERT GOTTSCHALK
Commissioner of Patents